(12) United States Patent
Tremblay et al.

(10) Patent No.: US 6,309,145 B1
(45) Date of Patent: Oct. 30, 2001

(54) PORTABLE MACHINE TOOL FOR CONDITIONING HEADER TUBE OPENINGS FOR BUTT-WELDING TUBES

(75) Inventors: Clement Tremblay, Citrus Heights; Jerald VanderPol, Shingle Springs, both of CA (US)

(73) Assignee: Tri Tool Inc., Rancho Cordova, CA (US)

( * ) Notice: Subject to any disclaimer, the term of this patent is extended or adjusted under 35 U.S.C. 154(b) by 0 days.

(21) Appl. No.: 09/585,360

(22) Filed: Jun. 2, 2000

(51) Int. Cl.$^7$ .............................. B23B 41/00; B23B 35/00

(52) U.S. Cl. .............................. 408/1 R; 82/113; 408/80; 408/111; 408/137; 409/178

(58) Field of Search .............................. 408/1 R, 79, 80, 408/81, 82, 93, 98, 100, 101, 137, 110, 111, 234; 409/132, 175, 178; 82/113

(56) References Cited

U.S. PATENT DOCUMENTS

| | | | |
|---|---|---|---|
| 4,470,734 | * | 9/1984 | Miller ...................... 408/82 |
| 4,498,820 | * | 2/1985 | Brennan .................. 408/82 |
| 4,533,284 | * | 8/1985 | Agius et al. ........... 408/111 |
| 5,531,550 | * | 7/1996 | Moruzzi ................. 408/82 |

\* cited by examiner

*Primary Examiner*—Daniel W. Howell
(74) *Attorney, Agent, or Firm*—Bacon & Thomas, PLLC

(57) ABSTRACT

A portable machine tool for removing stub ends of heat exchange tubes from a heat exchanger header or other plate structure and preparing the tube opening in the header for butt-welding a new tube at the opening. The tool includes a mandrel that may be locked within the tube opening and a plurality of stabilizing legs extending between the mandrel and the header for stabilizing the mandrel during machine tool operation. A cutting head is mounted concentrically on the mandrel and is advanced into engagement with the stub end of a heat exchange tube and it's respective opening to remove the stub end and prepare the opening for welding the new tube thereon.

18 Claims, 8 Drawing Sheets

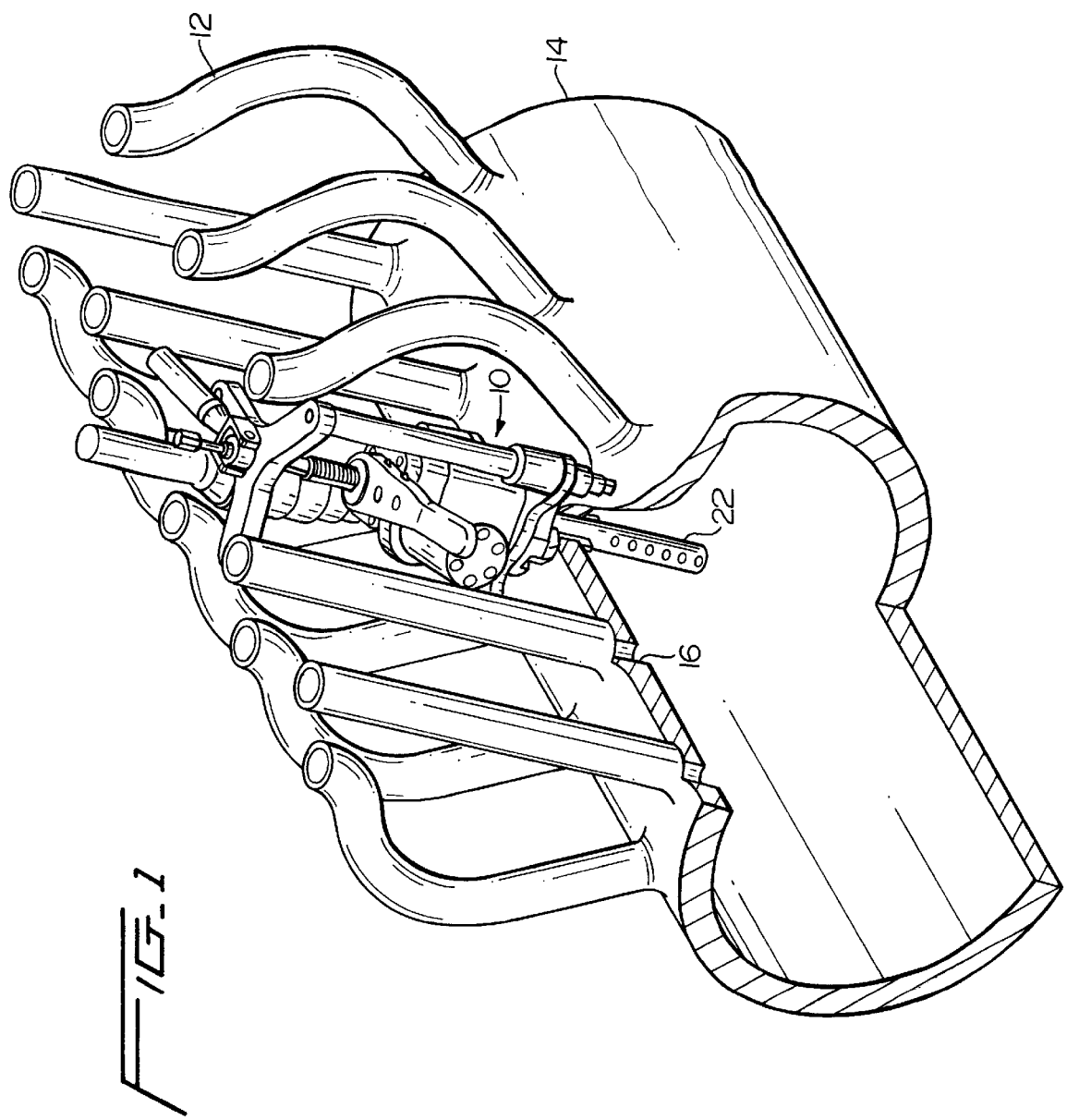

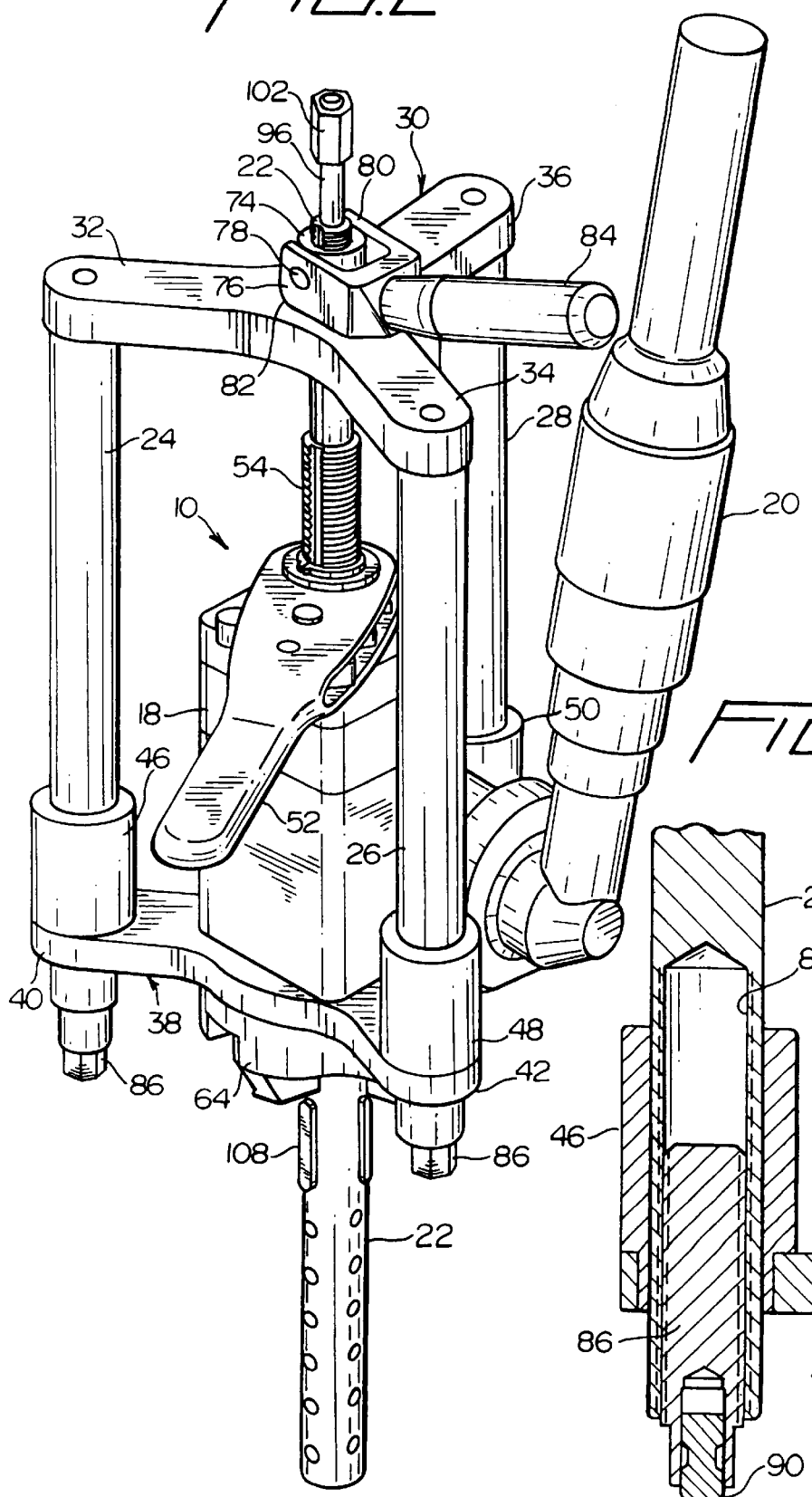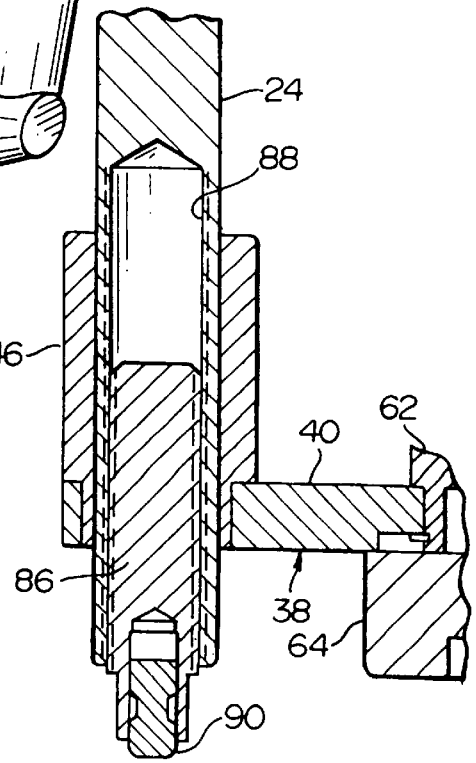

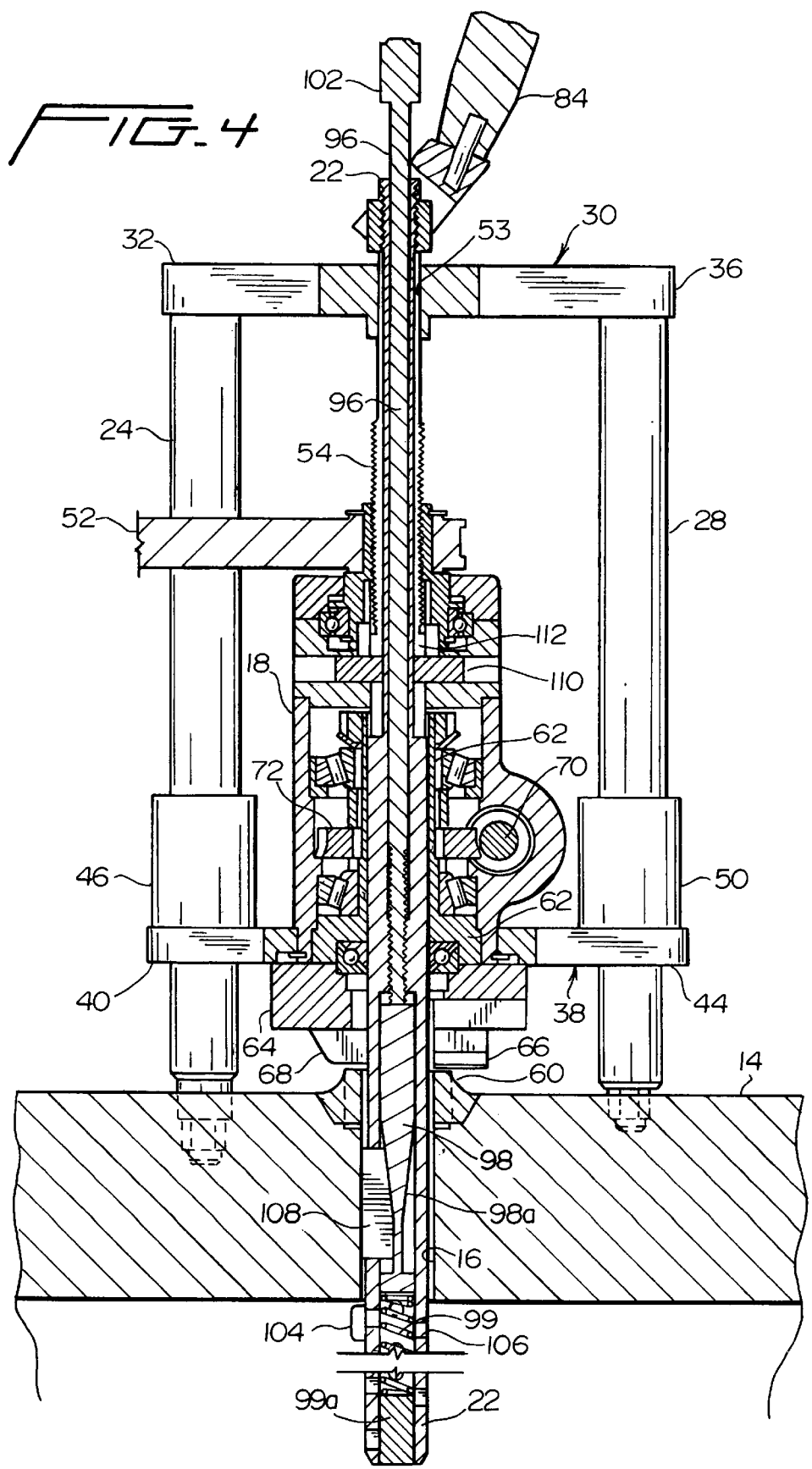

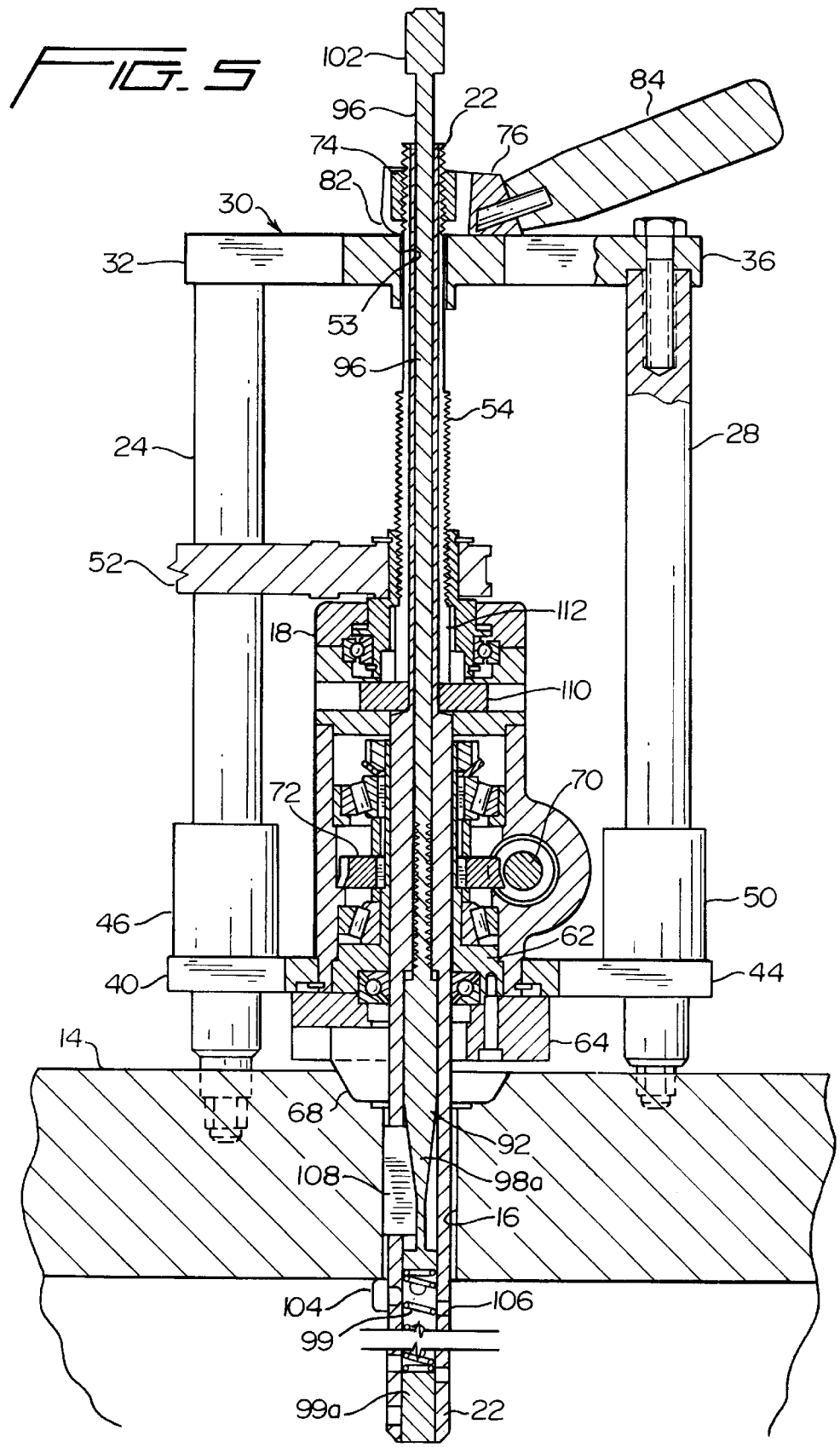

PORTABLE MACHINE TOOL FOR CONDITIONING HEADER TUBE OPENINGS FOR BUTT-WELDING TUBES

BACKGROUND OF THE INVENTION

1. Field of the Invention

This invention relates to portable machine tools useful for preparing existing openings in heat exchange header structures for butt-welding new heat exchange tubes thereto.

2. Discussion of Related Art

Prior art techniques are known for machining the ends of pipes and tubular conduits in preparation for welding wherein a portable machine tool is secured to the pipe or conduit by means of a centered mandrel locked within the pipe and supporting the machine tool. The machine tool is advanced along the mandrel to feed a cutter head into engagement with the end of the pipe in order to generate a profile suitable for welding the pipe to another pipe or another structure.

Such a technique also has been used to machine openings in structures to which a tube is to be butt-welded. In a procedure of this kind, a mandrel can be locked within the opening and the machine tool can be advanced into engagement with the surface material surrounding the opening on one side of the structure through which the opening extends. During machining, the machine tool is literally supported by the mandrel which must react the torque and bending loads imposed on the cutting head of the machine tool as well as axial and transverse forces imposed during the machining operation.

Large heat exchange systems, such as boilers, condensers, evaporators, etc. utilize multiple heat exchanger tubes that are in direct engagement with a heating or cooling medium and which contain a fluid medium in heat exchange relationship with the heating and cooling medium. Fluid is supplied and extracted from such tubes through larger conduits or tanks located at upper and lower areas of the heat exchanger and which distribute fluid through the heat exchanger tubes.

Because the heat exchanger tubes are exposed to severe environmental conditions, they must be removed and replaced with some frequency. Typically, a defective tube is cut from the header at a location closely adjacent the tube opening in the header and then a machining operation is performed to completely remove the stub end of the tube from the header while preparing the tube opening for butt-welding a replacement tube to the header.

The thickness of the sidewalls of such headers limits the surface area against which the machine tool mandrel may be anchored when it is desired to use a machine tool maneuverable along a mandrel of the type described above. Because of the instability of the mandrel over its full length, high loads imposed on the mandrel result in transverse bending of the mandrel which produces a poor quality finish of the machined surfaces.

It is highly desirable to stabilize the machine tool in a manner to avoid bending of a mandrel supported in a header opening during machining of the opening in preparation for butt-welding a new heat exchange tube to the opening.

BRIEF SUMMARY OF THE INVENTION

The present invention involves stabilizing the machine tool relative to a header opening by providing circumferentially spaced stabilizing legs engaging the outer surface of the header adjacent the opening and thereby stabilizing the mandrel extending through the opening for supporting the machine tool against motion relative to the header during machining of the opening area.

More specifically, a portable machine tool is provided that includes a longitudinal extending mandrel having a distal end area insertable into an opening of a header or other plate structure having inner and outer wall surfaces intersected by the opening. The mandrel distal end area is adapted to support a radially extending stop member and radially extendable centering blocks that secure the mandrel against withdrawal from the opening and center the mandrel within the opening.

A transversely extending upper plate is slidably mounted on the mandrel and has secured thereto circumferentially spaced stabilizing legs extending parallel to the mandrel towards the surface of the header or plate structure. A lower plate is also mounted on the mandrel and supports a machine tool drive and a cutting head facing the opening in the plate structure to be machined. The mandrel is stabilized against the header or plate structure by pulling upwardly against the mandrel by pressing downwardly against the stabilizing legs to react the mandrel load into the plate structure. The tensioned mandrel and compressed stabilizing legs, which are individually adjustable in length to accommodate any curvature in the header or plate structure, stabilizes the mandrel against transverse or bending loads during operation of the cutting head.

The machine tool may be advanced relative to the mandrel by a feed nut arrangement that may be manipulated by the tool operator. The machine tool drive preferably is mounted on the lower plate which is slidable along the stabilizing legs to enable the cutting head of the machine tool to remove any stub end of a tube previously butt-welded to the opening and to clear the opening area of any residual weldment remaining from the previous tube installation.

The invention will be understood upon consideration of the detailed written description that follows in conjunction with the appended drawings.

DESCRIPTION OF THE DRAWINGS

FIG. 1 is an upper perspective view of a portable machine tool of the present invention in position for machining header tube openings;

FIG. 2 is an upper perspective view of the machine tool illustrated in FIG. 1;

FIG. 3 is a detailed view of an adjustable stabilizing leg of the machine tool;

FIG. 4 is a side elevational view of the machine tool before initiation of a machining operation to prepare a header tube opening for butt-welding a header tube thereon;

FIG. 5 is a side elevation view of the machine tool shown in FIG. 4 after a machining operation has been executed;

DETAILED DESCRIPTION OF THE PREFERRED EMBODIMENT OF THE INVENTION

Figure 6:
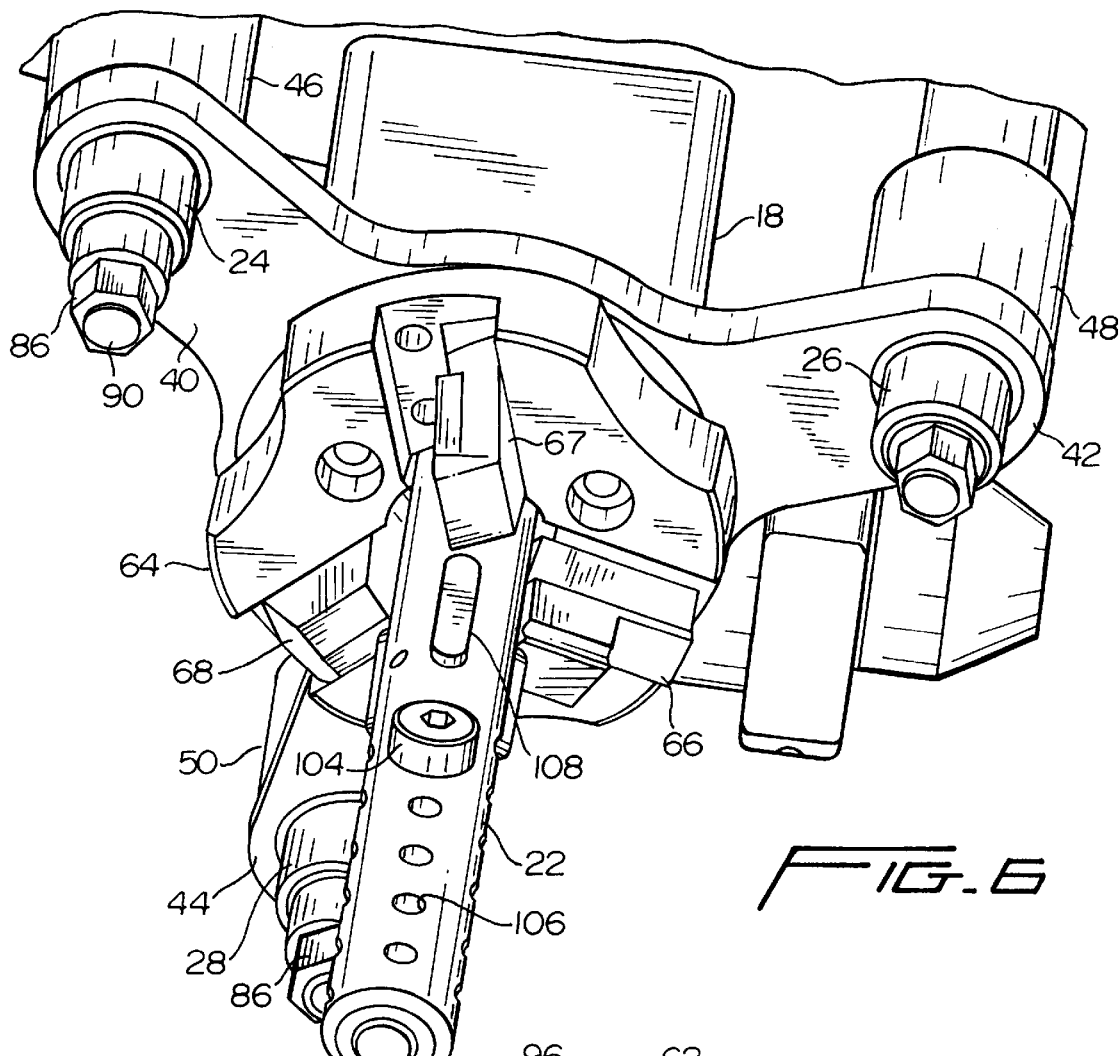
FIG. 6 is a lower perspective view showing the cutting head of the machine tool and the distal end of the mandrel extending through the central portion of the tool.

A portable machine tool 10 is configured so that it will fit between heat exchange tubes 12 of a header 14 constituting a heat exchange fluid containing and circulating system forming part of a heat exchanger, not illustrated. Such headers and heat exchange tubes are well known and may be located towards the upper or lower ends of a heat exchanger for distributing and collecting heat exchange medium circulating through the heat exchange tubes of the heat exchanger.

The machine tool 10, as shown in FIG. 1, is used after the major portion of a defective one of the heat exchange tubes 12 has been removed from an opening 16 on which the tube has been previously welded.

When it is desired or necessary to replace a heat exchange tube 12, the existing butt-welded tube must be cut from the header at a location adjacent its respective opening 16 in preparation for complete removal of the stub end of the tube that remains at the area of the opening.

A machining operation then must be carried out to remove the stub end of the tube 12 as well as any remaining portion of the tube and weldment that remains adjacent it's respective opening. This requires the machine tool to cut the stub end of the heat exchange tube flush with the surface of the header surface and then to continue machining inwardly of the surface of the header until all tube material has been removed and a new welding surface area has been prepared at the header tube opening. In general, an opening edge profile must be prepared in accordance with specifications that are established for welding the butt end of heat a exchange tube to the header at the respective opening.

The machine tool 10 according to the invention is shown in more detail in FIG. 2 and includes a housing 18, a drive motor 20 and a mandrel 22 that extends longitudinally centrally through the housing 18 and protrudes from opposite ends of the housing. The mandrel 22 is adapted to engage the inner wall of the header 14 in the area of opening 16 to be machined and the tool is stabilized and secured on the outer wall of the header by means of stabilizing legs 24,26 and 28 that are circumferentially spaced around and extend generally parallel to and adjacent the mandrel 22. The legs 24, 26 and 28 are connected at their upper or proximal ends to circumferentially spaced radial arms of an upper plate 30. The distal or lower ends of the legs 24, 26 and 28 extend through radially extending leg support arms 40, 42 and 44 (see FIG. 6 to view arm 44) of a lower plate or leg support 38 that are preferably slidably connected to the legs 24, 26 and 28 by means of sliding bearings 46,48 and 50 that enable the lower plate 38 to slide longitudinally along the legs 24, 26 and 28. Preferably, the lower plate 38 is rigidly secured to the housing 18 so that the sliding movement of the lower plate 38 along the legs carries the housing 18 with the lower plate 38.

The housing 18 may be moved in a controlled manner along the length of the mandrel 22 by means of a ratchet handle 52 that is connected to a threaded feed nut that threadedly engages a threaded outer portion 54 of mandrel 22 adjacent upper end of housing 18. Mandrel 22 slidably extends through a central opening 53 in upper plate 30.

Intermittent pivotal movement of ratchet handle 52 advances a feed nut along the threads 54 of feed rod 56 to thereby move the housing 18 and the lower plate 38 longitudinally along the mandrel 22 which is fixedly secured against relative movement within an opening 16 of the header 14 to which a stub end 60 of a removed heat exchange tube 12 is attached as a result of a previous welding procedure.

Housing 18 preferably rotatably supports a tool drive shaft 62 (FIG. 4) that is secured to a machine tool cutting head 64 that carries cutting tool bits 66, 67 and 68 in circumferentially spaced relationship and the bits having different cutting profiles to achieve different cutting operations when the cutting head 64 is advanced against the stub end 60 of a heat exchange tube and further when the cutting head 64 is advanced to a sufficient extent to cause the cutting tool bits to remove the remnants of the heat exchange tube that extends below a surface of the header 14 within the opening 16. (The three cutting tool bits 66, 67 and 68 may be viewed in more detail in FIG. 6).

Figure 7:
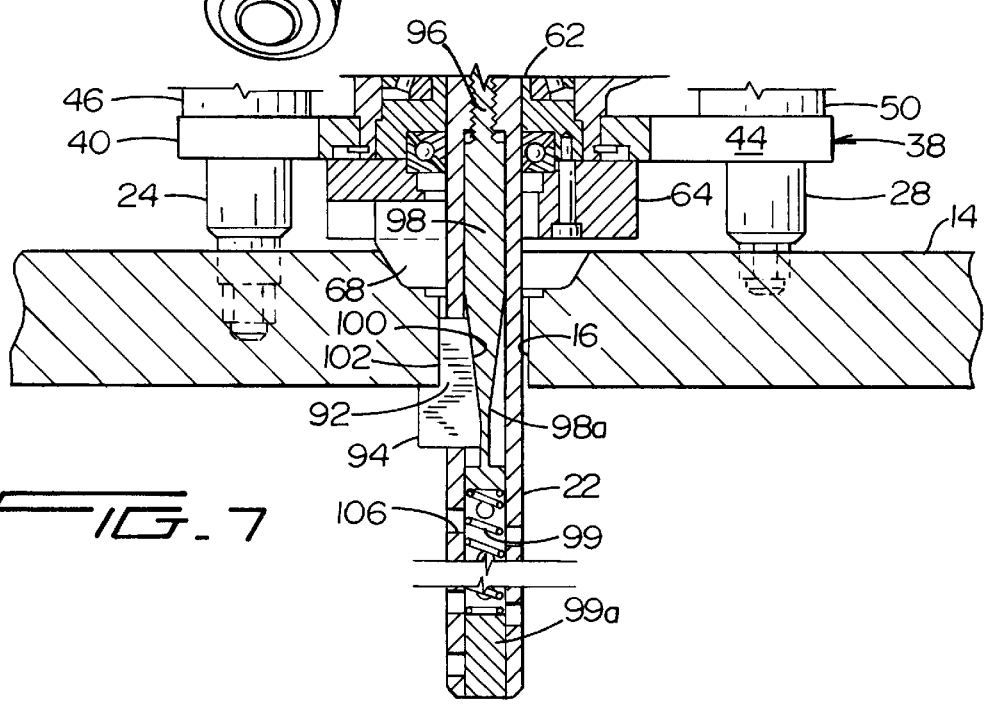
FIG. 7 is a detailed view of the distal end of the mandrel showing radially expanded header engaging blocks used to secure the mandrel and the machine tool relative to the header in cooperation the stabilizing legs of the tool.

Drive shaft 62 is driven in rotation for example by motor 20 via a worm gear 70 engaged with a ring gear 72 that is keyed to drive shaft 62 or other suitable drive transmitting arrangement. Appropriate bearings as illustrated support the drive shaft 62 within housing 18. Drive shaft 62 extends coaxially with mandrel 22 in close-fitting relationship in a manner that permits the drive shaft 62 to slide along the mandrel 22 while the mandrel 22 is fixedly held secured relative to the header 14. Thus, when ratchet handle 52 is pivoted by a tool operator to advance the housing 18 along the feed mandrel 22, the drive shaft 62 advances along the mandrel 22 with the cutting head 64. Accordingly, when the mandrel 22 is rigidly secured relative to the header 14, actuation of handle 52 will cause the cutting bits 66, 67 and 68 to advance relative to the stub end 60 of heat exchange tube 12 and into the opening 16 a suitable distance to remove the entire tube remnants from the area of the opening 16, as shown in FIG. 7.

The housing 18 in accordance with the preferred embodiment is supported by the lower plate 38 which is guided by means of bearings 46, 48 and 50 along stabilizing legs 24, 26, 28 which in turn are fixedly secured by appropriate fasteners to upper plate 30.

As shown best in FIGS. 2,4 and 5, an upper end of mandrel 22 extends beyond upper plate 30 and is connected by a threaded nut 74 to a pivotable cam element 76 by means of a pin 78. The pin extends transversely through bifurcated unshaped legs 80 of cam element 76 to enable transmittal of rotational torque between the cam element 76 and the nut 74. The pin 78 is located closer to the upper edges of legs 80 than the lower edges thereof as shown in FIG. 2. The lower sides of the legs 80 are curved at their forward ends to form camming surfaces 82 that engage the upper surface of upper plate 30 when the camming element 76 is pivoted about the pin 78 from an upper location as shown in FIG. 4 to a lower location as shown in FIG. 5. The effect of rotating the camming element 76 clockwise as seen in FIGS. 4 and 5 is to effectively pull the mandrel 22 upperwardly relative to the upper plate 30 and to drive the upper plate 30 downwardly relative to the header 14 to thereby place the assembly of the mandrel 22 and the tripod legs 24 in relative tension and compression, respectively, with the stabilizing legs 24 firmly engaging the exterior contour of the header 14 and the mandrel 22 engaging the inner side of the header 14 by means of a pin or step block stop element to be described below. The cam element 76 is secured to a handle 84 used to manipulate the cam element 76 by a tool operator.

Thus, an initial adjustment of the relationship between the mandrel 22 and the upper plate 30 can be made by rotating the handle 84 about the axis of the mandrel 22 after the mandrel 22 has been secured against longitudinal movement within an opening 16 of the header 14 and the legs are engaged with the outer surface of the header. The cam element 76 is then pivoted about the axis of transverse pin 78 by means of the handle 84 to push the upper plate 30 and legs 24, 26 and 28 downwardly in compression against a reacting tension force transmitted through mandrel 22 to thereby set the legs 24, 26 and 28 firmly against the exterior wall of the header 14 with the mandrel 22 reacting the loads in the legs.

The individual lengths of the legs 24, 26 and 28 may be adjusted by means of threaded extensions 86 shown in FIG. 3 that comprise pins having external threads threadedly engaging internally threaded bores 88 in the distal ends of the legs 24, 26 and 28. Rotation of the pins 86 extends or retracts the pins relative to the legs to thereby vary the effective lengths of the legs. Hardened contact pad elements 90 may be provided at the distal ends of the pins 86 and the distal ends of the pins 86 may be flattened to receive an adjusting wrench or tool for rotating the pins 86. Accordingly, the lengths of the respective legs 24, 26 and 28 may be individually adjusted to enable alignment of the legs with mandrel 22. Once the lengths of the legs have been adjusted, the entire assembly of machine tool, mandrel and legs may be moved from tube opening to tube opening of a given header without major adjustments of the lengths of the legs. This facilitates rapid setup of the machine tool and improves efficiency of operation of the tool.

The mandrel 22 may be locked within an opening 16 of the header 14 in either of two preferred ways in accordance with the invention. If the thickness of the sidewall of the header 14 is relatively thin as illustrated in FIG. 7, a stepped block 92 extending radially through an opening in mandrel 22 may be provided at a location along the mandrel 22 that will enable the enlarged step 94 of the block to engage the interior of the header 14 at a tube opening 16 when the mandrel 22 is pulled upwardly by the cam element 76 upon rotation of handle 84 downwardly as explained previously. The steps 94 thus reacts the tension loading on the mandrel 22 against the interior wall of the header 14 to thereby maintain the tension on the mandrel 22 and compression on the legs 24, 26 and 28. This locks the assembly firmly in place against motion relative to the header 14 to thereby permit precise machining of the opening 16 in the area where a new tube is to be welded to the header. The stabilizing legs are particularly effective when three legs are used as an effective tripod to stabilize the mandrel relative to a curved header surface.

To permit the block 92 to be inserted through an opening 16, the block 92 may be retracted radially within the mandrel 22 when the mandrel 22 is inserted through the opening 16 and thereafter expanded radially outwardly to engage the interior of the header 14 adjacent the opening 16. A block actuating shaft 96 extending concentrically through the mandrel 22 is threadedly engaged to the interior of the mandrel 22 and engages at its distal end a tapered rod 98 that includes a tapered section 98a that engages a co-extending internal inclined edge 100 of stepped block 92 whereby, upon longitudinal movement of the actuator shaft 96 towards rod 98, block 92 will be urged outwardly for engagement with the interior surface of the header 14 upon actuation of cam element 76. Rotation of the shaft 96 may be effected by means of flats 102 provided at the proximal end of the shaft 96, as shown in FIG. 7. Rod 98 is biased towards its proximal (or upper as illustrated) end by return spring 99 that is anchored at end plug 99a. The spring 99 returns the rod 98 when shaft 96 is rotated so as to withdraw it away from rod 98.

It will be noted that the stepped block 92 also includes an outer edge 102 extending parallel to the mandrel axis that engages the interior wall of tube opening 16 of header 14. At least three such stepped blocks 92 would be utilized in any application to ensure centering of the mandrel 22 within the opening 16.

In the alternative, a stop pin 104 as shown in FIGS. 4 and 6 may be threaded into threaded bores 106 provided along the distal area of mandrel 22 at suitable intervals that will permit fine adjustment of the location of a pin 104 along the length of the mandrel 22 at its distal end area, in particular the area adjacent the interior of the header 14 at a tube opening 16. The pin 104 preferably is circular and may be provided with a hardened surface to resist wear upon repeated engagement with the interior surface of the header 14.

Upon securing of pin 104 in a threaded bore 106 of mandrel 22, the cam element 76 is rotated to draw the pin 104 lightly against the interior of the header 14 as shown in FIG. 5 and then the cam element 76 is rotated to draw the pin 104 firmly against the inside wall of the header 14 to thereby prevent the mandrel 22 from moving axially within the opening 16. Continued rotation of the cam element 76 places the mandrel 22 in tension and the legs 24, 26 and 28 in compression, as described previously. Once the pin 104 has been placed on mandrel 22 and the legs 24, 26 and 28 have been adjusted, repeated machining operations can be carried out with minimum further adjustments to these elements for any given header.

The pin 104 is shaped so it can pass through the opening 16 by passing the mandrel 22 with the pin eccentrically through the opening and, when the pin clears the inner side of the header, centering the mandrel 22 so the pin interferes with removal of the mandrel from the opening.

It will be noted that the stepped block 92 is not utilized when the pin 104 is used and instead a plurality of non-stepped centering blocks 108 are used in cooperation with block actuator shaft 96 and rod 98 as described previously. Rotation of the shaft 96 in a distal direction drives the tapered distal end portion of the rod 98 into engagement with correspondingly formed inclined inner edges of blocks 108 to drive blocks 108 radially outwardly equally into engagement with the interior wall of opening 16. The radially outer ends of blocks 108 extend generally parallel with the axis of mandrel 22. By using at least three of the blocks 108 that are simultaneously actuated, the mandrel 22 is rigidly secured centrally within opening 16. It should be noted that the radial engagement between the blocks 92, 108 with the interior of the openings 16 resists torque loads of cutting head 64 reacted through the housing 18 resulting from a machining operation when the tool bits 66 engage the stub end of a heat exchange tube or the weldment between the tube and the header 14. Thus, the mandrel 22 absorbs virtually all reaction torque loads resulting from a machining operation with virtually no torque being applied to the legs 24, 26 and 28. A torque reacting key 110 engages a corresponding keyway 112 in mandrel 22 to react torque loads resulting from a machining operation into the mandrel 22. The keyway is elongated to accommodate sliding movement of the housing 18 along the mandrel 22 upon actuation of ratchet handle 52.

Ratchet handle 52 may be constructed in accordance with known principles, for example similar to a ratchet wrench, and includes a ratchet element (not shown) that permits one way drive of torque between a handle and a nut element within the handle, transmittal of the torque being reversible by adjustment of the ratchet within the handle.

In operation, upon removal of the main portion of a heat exchange tube 12 from the header 14 leaving a stub end 60 and its associated weldment at a tube opening 16, the assembly shown in FIG. 2 is maneuvered into place at the location of the opening. The distal end of the mandrel 22 is inserted within the opening 16 and the stabilizing legs are adjusted so that the mandrel 22 extends through the opening 16 essentially parallel with the axis of the opening. A choice between a stepped block 92 and a stop pin 104 is made, depending upon the thickness of the side wall of the header 14. A cam element 76 is rotated by handle 84 until the stepped block 92 or the stop pin 104 are closely adjacent the interior wall of the header 14 and then the cam is rotated down to place tension on the mandrel 22 and compression on legs 24, 26 and 28 that is reacted by the stepped block 92 or the stop pin 104.

The block actuator rod 96 is rotated at an appropriate time to drive the stepped block 92 or the non-stepped block 108 into firm engagement with the interior of the opening 16 (this may be carried out prior to rotation of the cam 76 when a stepped block is used) and the assembly is inspected to ensure that the legs 24, 26 and 28 are now in firm engagement with the exterior of the header 14 and the mandrel 22 is in alignment with the opening and placed in tension as a result of rotation of the cam element 76 to its position as shown in FIG. 5.

The feed handle 52 is then actuated to advance the housing 18 and the cutting head 64 to a position adjacent the stub end 60 of a tube 12, as illustrated in FIG. 4. The motor 20 is then actuated and the cutter head 64 is driven in rotation by the worm gear 70 and the ring gear 72 via the drive shaft 62. Continued manipulation of handle 52 rotates the feed nut along the threaded area 54 of mandrel 22 to advance the housing 18 and the cutter head 64 into engagement with the stub end 60 and eventually into the opening 16 to an extent necessary to clean out the weldment and the remainder of the stub end 60 of an existing heat exchange tube. Cutter tools bits 66, 67 and 68 generate desired profiles to leave the end area of the opening 16 adjacent the exterior of the header 14 in a desired condition for welding a new heat exchange tube at this location, as illustrated in FIG. 7.

Upon completion of the machining operation, the housing 18 and cutter head 64 are withdrawn from the header 14, the block actuator rod 96 is rotated to release it from engagement with the stepped or non-stepped block 92, 108 and the cam 76 is rotated in a reverse direction to disengage the stepped block 92 or the pin 104 from the interior of the header 14.

Figure 8:
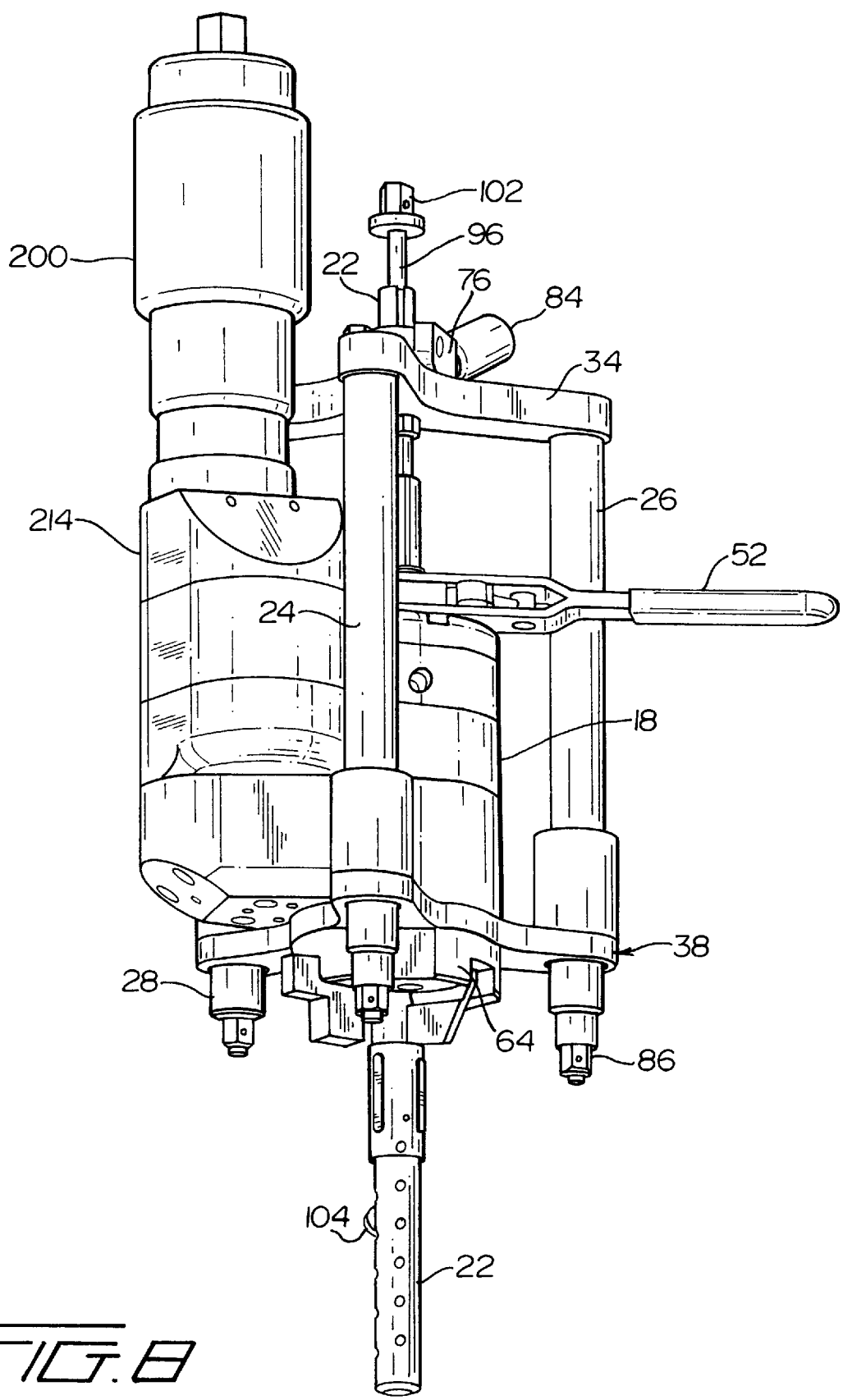
FIG. 8 shows an alternate form of the invention wherein the machine tool is provided with another embodiment of a gear drive system transmitting rotary input from a drive motor to the machine tool cutting head.
Figure 9:
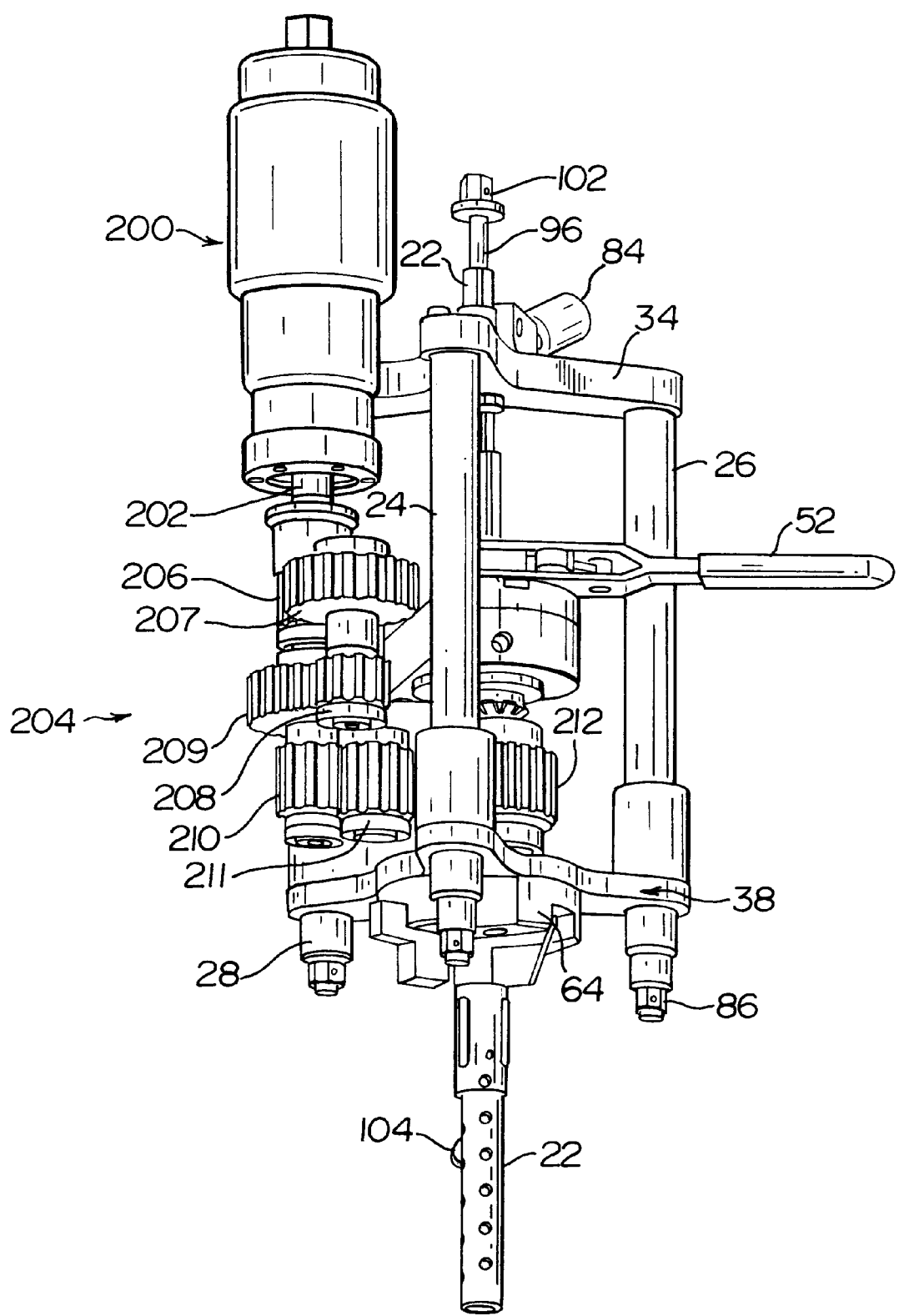
FIG. 9 shows the drive gear train and motor arrangement of the machine tool illustrated in FIG. 8.
Figure 10:
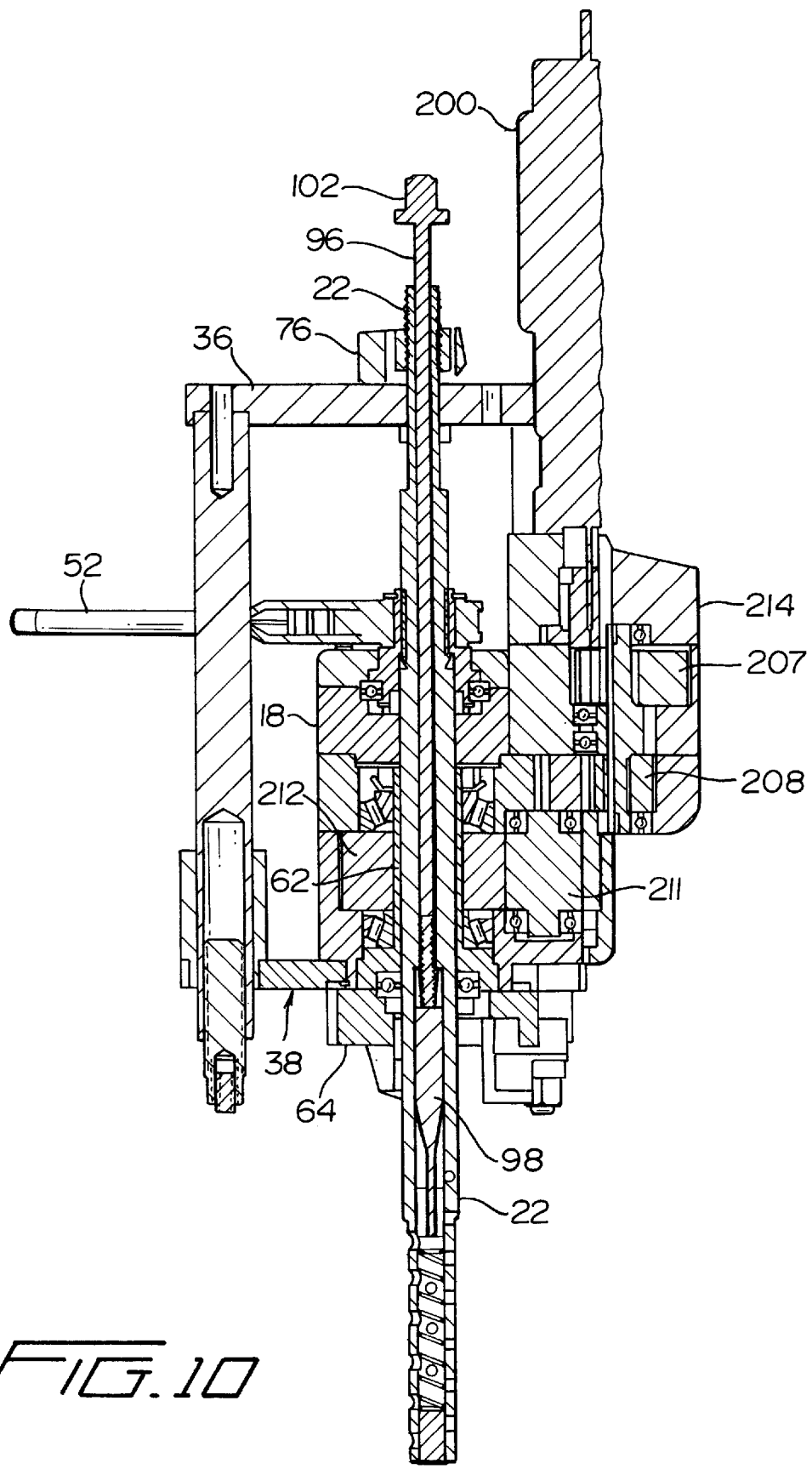
FIG. 10 is a longitudinal section view taken through the machine tool illustrated in FIGS. 8 and 9.

FIGS. 8, 9 and 10 illustrate an alternate form of the invention wherein a multiple reduction gear set is utilized to transmit driving torque from the machine tool motorto the cutting head, and wherein like reference numerals are utilized with respect to elements corresponding to the embodiment of the invention illustrated in FIGS. 1–7. In accordance with this embodiment of the invention, a motor 200 includes an output shaft 202 that is drivingly connected to a reduction gear set 204 including helical gears 206, 207, 208, 209, 210 and 211 connected in series, with final reduction gear 211 being coupled to helical ring gear 212 that is keyed to drive shaft 62 in a manner similar to ring gear 72 shown in FIGS. 4 and 5. In accordance with the embodiment shown in FIGS. 8–9, the motor 200, the gear train 204, gear train housing 214 and tool housing 18 are all connected to the lower plate 38 for movement therewith along mandrel 22 in the same manner as the motor 20, worm and ring gears 70,72 and housing 18 of the embodiment of the invention shown in FIGS. 1–7. The gear train 204 provides a gear reduction system enabling the use of a high torque motor 200 transmitting input rotational drive motion to drive shaft 62. Utilization of a gear train 204 facilitates transmittal of higher input torques to cutting head 64.

The invention has been described as used to prepare header openings for welding heat exchange tubes thereon, but it is to be understood that the tool can be used to prepare openings in any plate structure on which tubes are to be butt-welded, including flat and curved plates.

Various modifications to the above-described embodiment of the invention can be envisioned without departing from the scope of the invention. The specific arrangement described, for example, for mounting a stop element 104 to the distal end of the mandrel 22 can be varied in any practical manner provided that the stop is secured to the mandrel in a manner to permit the mandrel to enter an opening in the plate structure to be machined and then secured against withdrawal through the opening when the machine tool is fixed to the outer surface of the plate structure. The specific manner described for expanding the centering blocks 108 also may be modified in accordance with known principles relating to centering blocks for mandrels used to secure machine tools within circular openings such as pipes and tubular conduits. The arrangement of tool bits on the cutting head 64 may be modified in accordance with known principles related to preparation of weld areas in general. The specific mounting arrangement of the housing 18 on the mandrel 22 may be varied in accordance with known machine tool principles. Likewise, the specific drive arrangement need not necessarily be a worm and ring gear arrangement, or a helical reduction gear set, but could be formed of any appropriate drive system enabling transmittal of drive torque to the tool drive shaft and cutting head but could instead be constituted of any suitable arrangement to transmit torque from a driving motorto a cutting head in accordance with known machine tool principles.

The feed nut arrangement may be varied in accordance with known machine tool principles, in particular portable lathes and similar tools that include a feed arrangement for advancing the machine tool along a mandrel or the equivalent.

The specific cam arrangement disclosed herein may be varied in accordance with known principles, provided that a suitable preset force may be applied to the top plate 30 to urge it downwardly along the mandrel 22 so that the mandrel 22 is placed in tension and the legs 24, 26 and 28 are placed in compression.

The upper and lower plates 30, 38 need not be configured in the manner described herein, but may be constituted of any structural members capable of carrying out the function of the plates 30,38. The legs 24, 26 and 28 may be solid rods or tubular and may be constructed of any suitable material having a cross-section that provides structural rigidity for the legs during operation of the tool. For example, the legs could be channels or other extruded shapes that could provide a guiding function for the lower plate 38.

The lower plate 38 may be guided along the legs 24, 26 and 28 in any appropriate manner that will result in the plate 38 being maintained in a proper position relative to mandrel 22 and the legs 24, 26 and 28.

The housing 18 and cutting head 64 need not be moveable as a unit with lower plate 38 relative to the legs 24, 26 and 28, although it has been observed that certain advantages are obtained with this arrangement. In the alternative, the lower plate 38 may be rigidly or adjustably secured to the lower ends of legs 24, 26 and 28 and the cutting head 64 and its associated drive shaft may be translatable relative to housing 18 so as to be moveable towards and away from the header 14 relative to the housing 18. With this arrangement, an appropriate feed device would be provided to simply advance the cutting head 64 along the mandrel 22 without advancing the housing 18 or the lower plate 38. With this arrangement, a suitable cutting head feed arrangement such as a screw thread, cam or other appropriate means could be provided to advance the cutting head 64 towards and away from the header 14 while the housing 18 and the lower plate 38 are maintained fixed in their relative positions. Also, with this arrangement, the housing 18 could by supported by any appropriate structure relative to the legs 24, 26 and 28 and need not necessarily be mounted on lower plate 38, which then would simply become a brace to hold the lower ends of legs 24, 26 and 28 in their stabilizing positions. Torque reaction loads in accordance with any such modifications would be reacted by the mandrel 22.

While legs 24, 26 and 28 are shown extending parallel to the mandrel 22, this being the most practical arrangement of the assembly, they could be inclined away from the centerline of the mandrel 22 provided that the lower plate 38 need not slide along the lower ends of the legs.

The appended drawings and the foregoing description are intended to describe a preferred embodiment of the invention in accordance with the governing patent laws and regulations and it will be understood that various modifications equivalent to the described structure may be made by those skilled in the art without departing from the scope of the invention as defined in the following claims.

What is claimed is:

1. A portable machine tool adapted to prepare openings in a plate structure for butt-welding of tubes thereon comprising:

a longitudinally extending mandrel having a distal end area adapted to be inserted into an opening of a plate structure having inner and outer wall surfaces intersected by the opening, and a proximal end area;

said distal end area of the mandrel adapted to support a radially extendable stop member and radially extendable centering elements;

an upper plate associated with the proximal end area of the mandrel, said upper plate transversely extending relative to and longitudinally slidable relative to the proximal end area of the mandrel;

circumferentially spaced legs secured to the upper plate, each leg extending generally parallel to the mandrel towards the distal end of the mandrel and terminating at a leg distal end;

lower leg supports connected to and extending transversely of said mandrel, said lower leg supports engaging and supporting said legs against transverse movement relative to the mandrel;

a leg moving device connected between the upper plate and the proximal end area of the mandrel operable to move the upper plate and the legs relative to the mandrel in a direction towards the distal end area of the mandrel;

a tool driving system carried by the mandrel;

a cutting head facing towards the distal end of the mandrel and mounted so as to be movable towards and away from the distal end of the mandrel;

a feed mechanism operable to cause movement of the cutting head along the mandrel towards and away from the distal end area of the mandrel;

said tool driving system operable to transmit rotary input motion to the cutting head.

2. The portable machine tool as claimed in claim 1, wherein said mandrel is tubular in cross-section and including a centering block actuator extending within the mandrel from its proximal end area to a location at which radially extending centering blocks may be mounted, said actuator including a motion input device operable to move the actuator between block extending and block retracting positions.

3. The portable machine tool as claimed in claim 1, including longitudinally spaced openings extending along the distal end area of the mandrel, said openings arranged to receive and secure therein a radially extendable stop member at longitudinally spaced increments along the mandrel distal end.

4. The portable machine tool as claimed in claim 1, said drive system being coupled to the mandrel so as to react machining torque loads into the mandrel during operation of the machine tool.

5. The portable machine tool as claimed in claim 1, said feed mechanism comprising a feed nut arranged to be manipulated by a tool operator and which is threadedly connected to a threaded portion of the mandrel, said mandrel extending through the tool driving mechanism.

6. The portable machine tool as claimed in claim 5, said tool driving system including a cutting head drive shaft extending concentrically with said mandrel and connected to said cutting head.

7. The portable machine tool as claimed in claim 1, each of said legs having a device connected thereto that enables adjustment of the total length of the leg between the upper plate and the distal end of the leg.

8. The portable machine tool as claimed in claim 1, wherein said legs consist of three adjustable length legs circumferentially equally spaced around the mandrel to effectively form a tripod during use of the tool.

9. The portable machine tool as claimed in claim 1, said leg moving device comprising a movable element operable between the mandrel proximal end area and the upper plate;

a movable element manipulation device operable to enable movement of the movable element by a tool operator to move the movable element longitudinally relative to the mandrel and upper plate; and a movable element position adjuster operable when activated to adjust the relative position of the movable element along the mandrel length.

10. The portable machine tool as claimed in claim 1, said lower leg supports slidably connected to said legs so as to be guided by the mandrel and legs for linear movement along the mandrel.

11. The portable machine tool as claimed in claim 10, said lower leg supports comprising a lower plate and said tool driving system mounted on the lower plate for movement therewith relative to the mandrel.

12. The portable machine tool as claimed in claim 1, wherein said radial stop member and centering blocks comprise stepped centering blocks including a radially protruding offset step portion operable to engage an inner wall surface intersected by an opening through which the mandrel is extendable;

a block actuator operable to be manipulated between block extended and block retracted positions;

said block actuator coupled to said step centering blocks for transmitting and enabling block extending and block retracting movements.

13. A method of preparing openings in a plate structure having inner and outer surfaces intersected by the openings for butt-welding tubes to the openings at the outer surface of the structure, comprising:

extending a mandrel through and supporting such mandrel centrally in an opening in alignment with the axis of the opening;

fixing the mandrel against withdrawal from the opening by a stop member engaging an inner surface of the structure adjacent the opening;

slidably mounting a transversely extending upper plate on the mandrel;

mounting a rotary cutting head carrying cutter tool bits on the mandrel for movement along the mandrel toward and away from the distal end area of the mandrel;

rigidly mounting a plurality of stabilizing legs to the upper plate so the legs extend generally parallel with the mandrel towards the structure;

causing the upper plate and legs to be driven towards the structure along the mandrel by a force applying device operable between the mandrel and the upper plate that places the mandrel in tension and the legs in compression, with the mandrel tension reacted by the stop member and the leg compression reacted by the outer surface of the structure;

advancing the machine tool cutter head by a tool feed device along the mandrel towards and into engagement with the opening area of the structure while driving the cutting head in rotation;

machining the opening area at the outer surface of the structure to a desired form and withdrawing the cutting head from the opening upon completion of the machining step;

releasing the mandrel from the opening and removing the mandrel and machine tool elements connected to the mandrel from the opening area.

14. The method as claimed in claim 13, wherein the structure is convex curved and including using three equally circumferentially spaced stabilizing legs attached to the upper plate.

15. The method as claimed in claim 13, wherein the legs are individually variable in length and including the step of adjusting the leg lengths so the compression forces in the legs are equalized when the legs are driven into engagement with the structure.

16. The method as claimed in claim 13, including using a cam device connected between the mandrel and upper plate to drive the upper plate and legs relative to the mandrel.

17. The method as claimed in claim 13, including using individual locking elements carried by the mandrel that are each capable of both centering the mandrel in the aperture and securing the mandrel against withdrawal from the aperture when radially extended relative to the mandrel while partially within the aperture.

18. The method as claimed in claim 13, including mounting lower leg supports on the mandrel longitudinally spaced from the upper plate towards the distal end of the mandrel, said lower leg supports including a lower plate that is slidably connected to the stabilizing legs for slidable movement along the legs; and mounting the cutting head on the lower plate for movement therewith in order to carry out the steps of advancing the cutting head along the mandrel, machining the opening area, and withdrawing the cutting head.

* * * * *